United States Patent
Lee et al.

(10) Patent No.: US 9,099,878 B2
(45) Date of Patent: Aug. 4, 2015

(54) WIRELESS POWER TRANSMITTER AND WIRELESS POWER TRANSCEIVER

(75) Inventors: Kwang Du Lee, Jeollanam-do (KR); Duk Woo Lee, Gyunggi-do (KR); Jeong Hoon Kim, Seoul (KR); Young Seok Yoon, Gyunggi-do (KR); Tae Sung Kim, Seoul (KR); Eung Ju Kim, Gyunggi-do (KR); Sang Hoon Hwang, Seoul (KR); Chul Gyun Park, Gyunggi-do (KR); Jung Ho Yoon, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 861 days.

(21) Appl. No.: 13/232,482

(22) Filed: Sep. 14, 2011

(65) Prior Publication Data
US 2012/0242158 A1    Sep. 27, 2012

(30) Foreign Application Priority Data

Mar. 23, 2011    (KR) .................. 10-2011-0025806

(51) Int. Cl.
*H01F 27/42* (2006.01)
*H02J 5/00* (2006.01)
*H02J 17/00* (2006.01)

(52) U.S. Cl.
CPC ...... *H02J 5/005* (2013.01); *H02J 17/00* (2013.01)

(58) Field of Classification Search
CPC .................................. H02J 5/005; H02J 17/00
USPC ........................................................ 307/104
See application file for complete search history.

(56) References Cited

U.S. PATENT DOCUMENTS

| 2010/0093292 A1 | 4/2010 | Kim et al. |
| 2010/0222010 A1* | 9/2010 | Ozaki et al. ............ 455/77 |
| 2011/0018358 A1 | 1/2011 | Kozakai |

FOREIGN PATENT DOCUMENTS

| CN | 101730209 A | 6/2010 |
| CN | 101964074 A | 2/2011 |
| CN | 101964678 A | 2/2011 |
| KR | 10-2001-0006519 A | 1/2001 |
| KR | 10-2005-0105200 A | 11/2005 |

(Continued)

OTHER PUBLICATIONS

Korean Office Action, and English translation thereof, issued in Korean Patent Application No. KR 10-2011-0025806 dated Jun. 5, 2012.

(Continued)

*Primary Examiner* — Daniel Cavallari
(74) *Attorney, Agent, or Firm* — McDermott Will & Emery LLP (57) ABSTRACT

Disclosed are a wireless power transmitter capable of transmitting power wirelessly according to an impedance of an output side and a wireless power transceiver. There are provided a wireless power transmitter and a wireless power transceiver including: a wireless power transmitting unit converting input power into a preset transmission power and transmitting the converted input power wirelessly; and a controlling unit controlling a transmission of the transmission power according to a level of output impedance of the transmission power output from the wireless power transmitting unit.

26 Claims, 11 Drawing Sheets

(56) References Cited

FOREIGN PATENT DOCUMENTS

| KR | 10-2008-0038683 A | 5/2008 |
| WO | WO-99/43096 A1 | 8/1999 |
| WO | WO-2004/073166 A2 | 8/2004 |
| WO | 2010/108191 A1 | 9/2010 |

OTHER PUBLICATIONS

Office Action Chinese Patent Application No. 201110289009.5 dated Dec. 13, 2013 with English translation.

Chinese Office Action issued in Chinese Patent Application No. 201110289009.5 dated Aug. 26, 2014, with English Translation.

* cited by examiner

WIRELESS POWER TRANSMITTER AND WIRELESS POWER TRANSCEIVER

CROSS-REFERENCE TO RELATED APPLICATIONS

This application claims the priority of Korean Patent Application No. 10-2011-0025806 filed on Mar. 23, 2011, in the Korean Intellectual Property Office, the disclosure of which is incorporated herein by reference.

BACKGROUND OF THE INVENTION

1. Field of the Invention

The present invention relates to a wireless power transmitter capable of transmitting power wirelessly, according to an impedance of an output side and a wireless power transceiver.

2. Description of the Related Art

Recently, with the development of wireless communications technology, an ubiquitous information environment in which people may transmit and receive desired information at any time and and in any location has been created.

However, most information telecommunications devices are supplied with power by a power cord or wire, thereby limiting the movements of a wireless terminal user. Meanwhile, some information telecommunications devices are supplied with power by a battery, but in even this case, there are problems in that a use time of an information telecommunications device may be limited after charging, and the information telecommunications devices are supplied with power by a power cord or wire at the time of the charging of the battery thereof.

SUMMARY OF THE INVENTION

An object of the present invention provides a wireless power transmitter capable of transmitting power wirelessly according to an impedance of an output side and a wireless power transceiver.

According to an exemplary embodiment of the present invention, there is provided a wireless power transmitter, including: a wireless power transmitting unit converting input power into a preset transmission power and transmitting the converted input power wirelessly; and a controlling unit controlling a transmission of the transmission power according to a level of output impedance of the transmission power output from the wireless power transmitting unit.

The wireless power transmitting unit may include: an oscillator oscillating the input power at a preset resonance frequency; a switching part switching a path of the power oscillated by the oscillator; a power amplifier amplifying the power supplied through the path formed by the switching part; and a resonator resonating the power oscillated by the oscillator or the power amplified by the power amplifier at the resonance frequency and transmitting the power wirelessly by performing impedance matching.

The wireless power transmitting unit may further include a path providing part individually providing a path of the power transferred to the resonator and a path of the power reflected by impedance mismatch.

The wireless power transmitting unit may further include a power converter converting commercial AC power into DC power and providing the converted DC power as the input power.

The controlling unit may include: a first detector detecting a current level of the input power input to the oscillator; a second detector detecting a power level of the reflected power; and a switching controller controlling the switching of the path performed by the switching part according to detection signals of the first detector and the second detector.

The controlling unit may include: a detector detecting a current level of the input power input to the oscillator; and a switching controller controlling the switching of the path performed by the switching part according to a detection signal of the detector.

The detector or the first detector may include at least one detection resistor connected between a driving power end supplying a preset driving power and the oscillator in series.

The second detector may include: a pin diode receiving the reflected power; an inductor connected to the pin diode in series and outputting the detection signals; a capacitor connected between a connection point of the pin diode and the inductor and a ground in series; and a resistor connected between an output end of the inductor and the ground in series.

The switching controller may be an exclusive NOR gate operating exclusive NOR on the detection signals from the first detector and the second detector.

The wireless power transmitting unit may transmit the transmission power by a magnetic resonance method or a magnetic induction method.

The wireless power transmitter may further include a communications unit communicating with a wireless power receiver by a previously established communications method.

According to an exemplary embodiment of the present invention, there is provided a wireless power transceiver, including: a wireless power transmitter having a wireless power transmitting unit converting input power into a preset transmission power and transmitting the converted input power wirelessly, and a controlling unit controlling a transmission of the transmission power according to a level of output impedance of the transmission power output from the wireless power transmitting unit; and a wireless power receiver charged by being supplied with the transmission power from the wireless power transmitter.

The wireless power receiver may include: a wireless power receiving unit supplied with the transmission power and converting the received transmission power into a preset driving power; and a charging unit allowing the driving power from the wireless power receiving unit to be charged.

The wireless power transmitter may further include a first communications unit communicating with the wireless power receiver by a previously established communications method, and the wireless power receiver may further include a second communications unit being woken up by the wireless power receiving unit and communicating with the first communications unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will be described in detail with reference to the accompanying drawings.

Figure 1:
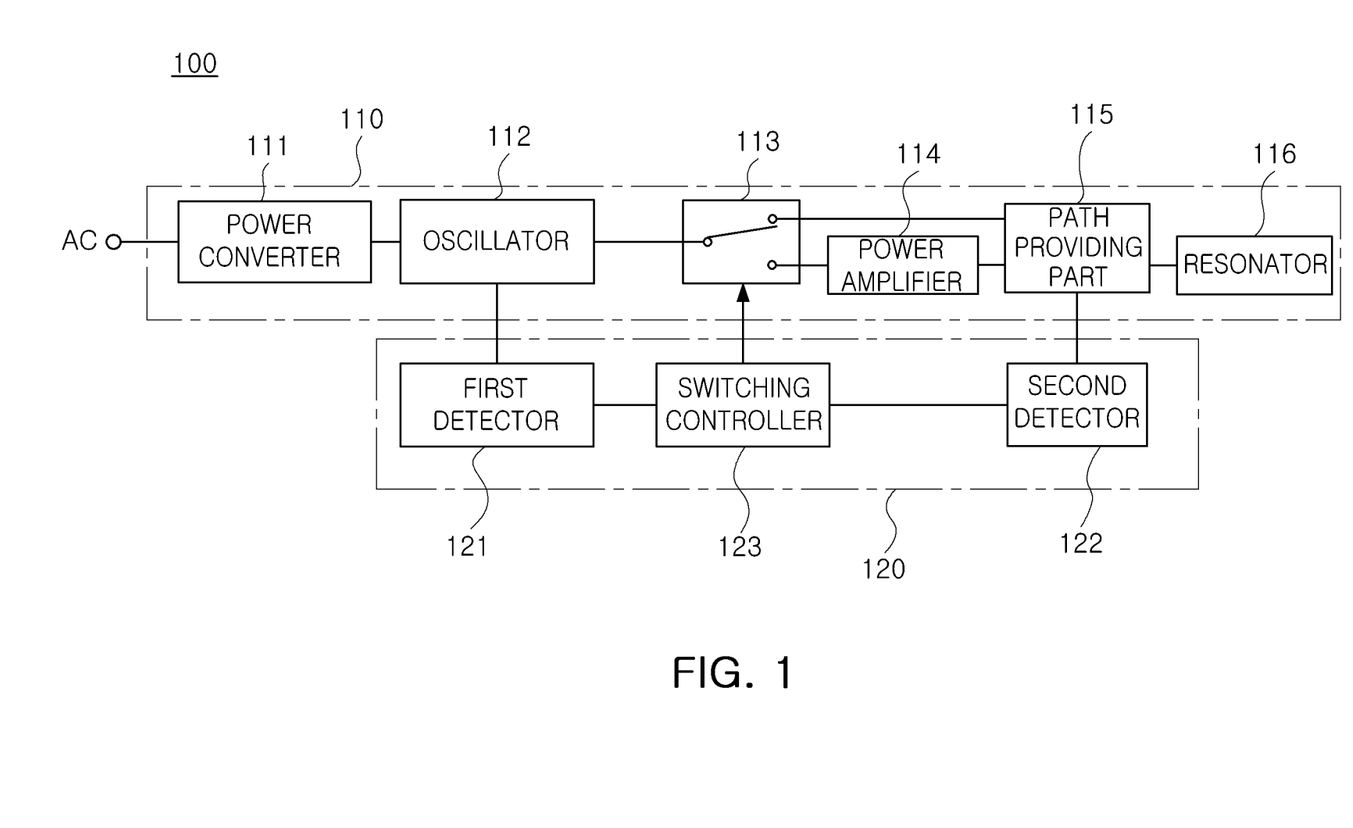
FIG. 1 is a schematic configuration diagram of a wireless power transmitter according to an exemplary embodiment of the present invention.

FIG. 1 is a schematic configuration diagram of a wireless power transmitter according to an exemplary embodiment of the present invention.

Referring to FIG. 1, a wireless power transmitter 100 according to an exemplary embodiment of the present invention may include a wireless power transmitting unit 110 and a controlling unit 120.

The wireless power transmitting unit 110 may convert input power into preset transmission power and transmit the converted transmission power wirelessly, and the controlling unit 120 may control the transmission of the transmission power according to a level of output impedance of the transmission power output from the wireless power transmitting unit 110.

To this end, the wireless power transmitting unit 110 may include an oscillator 112, a switching part 113, a power amplifier 114, a path providing part 115, and a resonator 116 and may further include a power converter 111.

The oscillator 112 may oscillate the input power at a preset resonance frequency and convert the oscillated input power into transmittable power. In this case, the resonance frequency may be equal to the resonance frequency of the receiving side receiving power wirelessly.

The switching part 113 may provide a path for the transfer of power oscillated from the oscillator 112 to the resonator 116 or a path for the transfer of power oscillated from the oscillator 112 to the power amplifier 114. The switching part 113 may provide the path that basically transfers the power oscillated from the oscillator 112 to the resonator 116 at the time of an initial operation.

The power amplifier 114 may amplify the level of the power oscillated from the oscillator 112 transferred along the transfer path formed by the switching part 113 to a level sufficient for wireless transmission.

The path providing part 115 may provide a path for the transfer of the power oscillated from the oscillator 112 transferred along the transfer path formed by the switching part 113 or the power amplified from the power amplifier 114 to the resonator 116 and provide a path for the transfer of power reflected due to an impedance mismatch among powers transmitted from the resonator 116 to the controlling unit 120.

The resonator 116 may resonate the power oscillated from the oscillator 112 that is transferred along the transfer path formed by the switching part 113 or the power amplified from the power amplifier 114 at the resonance frequency and may match the impedance of the output end in advance to transmit the resonated power wirelessly. In this case, when the receiving side receiving the power transmitted wirelessly is not present or the receiving side receiving power is fully charged and no longer receiving power, the impedance of the output end of the resonator 116 is mismatched and thus, the power transferred from the resonator 116 is reflected. The path providing part 115 may transfer the power reflected from the resonator 116 to the controlling unit 120.

Meanwhile, the power converter 111 may convert commercial AC power supplied from the outside into DC power to provide the input power to the oscillator 112.

The controlling unit 120 may control the path switching of the switching part 113 based on a current level of the input power transferred to the oscillator 112 and a power level reflected from the resonator 116. To this end, the controlling unit 120 may include a first detector 121, a second detector 122, and a switching controller 123.

The first detector 121 may detect the current level of the input power transferred to the oscillator 112 and the second detector 122 may detect the power level of the power reflected from the resonator 116. Detection signals of the first detector 121 and the second detector 122 are each transferred to the switching controller 123, the switching controller 123 may control the path switching of the switching part 113 so that the switching part 113 provides the path transferring the power oscillated from the oscillator 112 to the resonator 116 or the path transferring the power oscillated from the oscillator 112 to the power amplifier 114, based on the detection signals of the first detector 121 and the second detector 122.

Figure 2A:
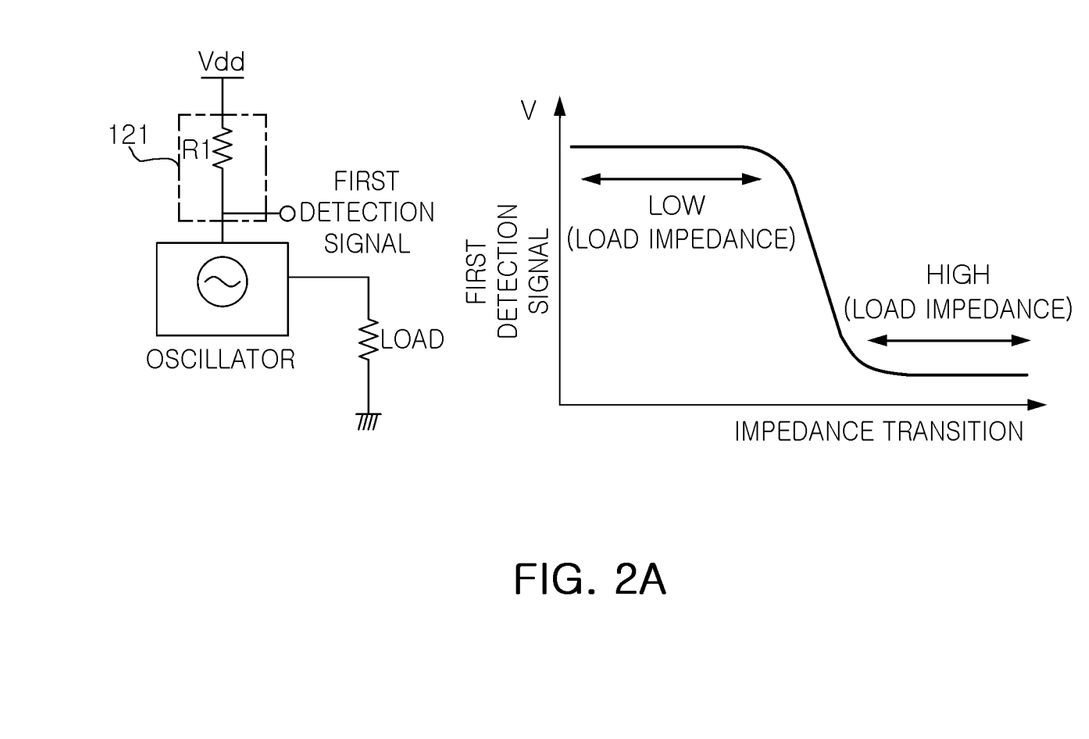
FIGS. 2A and 2B are schematic configuration diagrams of a first detector or a second detector used in the wireless power transmitter of the exemplary embodiment of the present invention and graphs showing a change in voltage.
Figure 2B:
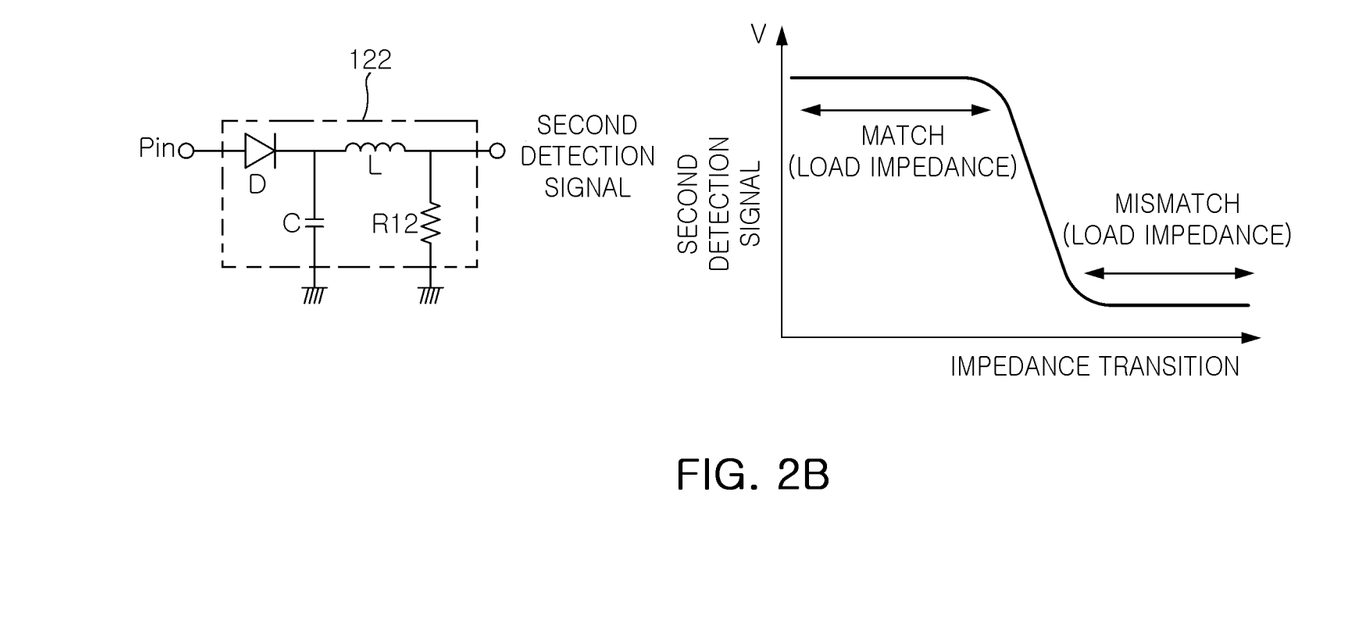
Figure 2C:
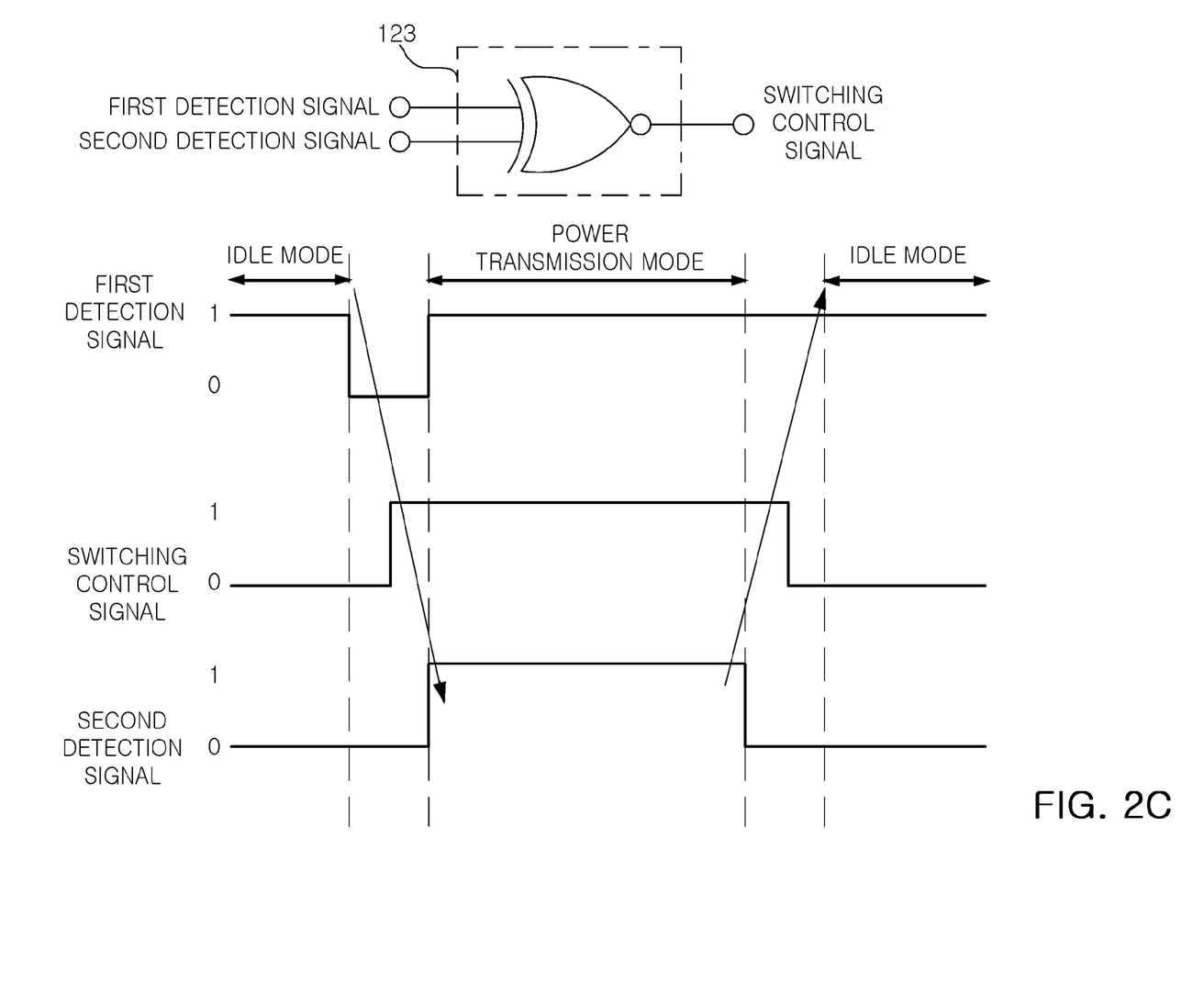
FIG. 2C is a schematic configuration diagram of a switching controller used in the wireless power transmitter of the exemplary embodiment of the present invention and a mode conversion timing chart.

FIGS. 2A and 2B are schematic configuration diagrams of the first detector or the second detector used in the wireless power transmitter of the exemplary embodiment of the present invention and graphs showing a change in voltage, and FIG. 2C is a schematic configuration diagram of the switching controller used in the wireless power transmitter of the exemplary embodiment of the present invention and a mode conversion timing chart.

Referring to FIG. 2A, the first detector 121 used in the wireless power transmitter 100 according to the exemplary embodiment of the present invention may include at least one detection resistor R1, wherein the detection resistor R1 may be electrically connected between the driving power end supplying a preset driving power Vdd and the oscillator 112. When the load impedance viewed from the oscillator 112 is low, the voltage level of a first detection signal of the first detector 121 is high, and when the load impedance viewed from the oscillator 112 is high, the voltage level of the detection signal of the first detector 121 is low. That is, when the receiving side receiving the power wirelessly is present or the receiving side receives maximal power, the output voltage of the oscillator 112 is increased, and thus, the current level of the input power applied to the oscillator 112 is increased, such that the voltage drop is increased due to the detection resistor R1 and the voltage level of the first detection signal is low. On the other hand, when the receiving side is not present or the receiving side does not have to receive power due to being fully charged, the output voltage of the oscillator 112 is reduced and thus, the current level of the input power applied to the oscillator 112 is reduced, such that the voltage drop is reduced due to the detection resistor R1 and the voltage level of the first detection signal is increased.

Referring to FIG. 2B, the second detector 122 used in the wireless power transmitter 100 according to the exemplary embodiment of the present invention may include a pin diode D that is a type of a schottky diode, an inductor L, a resistor R, and a capacitor C, wherein the pin diode D may receive power Pin reflected to an anode and a cathode thereof may be connected to one end of the inductor L and one end of the capacitor C. The other end of the capacitor C may be connected to a ground and the other end of the inductor L may transfer a second detection signal. The resistor R may be electrically connected between the other end of the inductor R and the ground. When the impedance (load impedance) of the output end of the resonator 116 is matched, the voltage level of the second detection signal of the second detector 122 may be increased, and when the impedance (load impedance) of the output end of the resonator 116 is mismatched, the voltage level of the second detection signal may be reduced. As a result, the state of the receiving side, wirelessly supplied with power, may be detected.

The switching controller 123 may be implemented as a microprocessor having software, and referring to FIG. 2C, the switching controller 123 maybe implemented as an exclusive NOR gate that receives the first detection signal of the first detector 121 and the second detection signal of the second detector 122 to operate exclusive NOR of the first and second detection signals. Therefore, the switching controller 123 may control the switching part 113 to provide a path for the transfer of power oscillated from the oscillator 112 to the resonator 116 during the initial operation or in an idle mode that does not have to transmit a considerable amount of power to the receiving side and control the switching part 113 to provide a path for the transfer of power oscillated from the oscillator 112 to the power amplifier 114 in a transmission mode.

As a result, when the wireless power transmitter is operated, the oscillator 112 oscillates the input power from the power converter 111 at the resonance frequency and transfers the oscillated input power to the switching part 113. The switching part 113 may bypass the power oscillated at the time of the initial operation in order for the oscillator 112 to detect the load impedance, that is, for the first detector 121 to detect the current level of the input power and may transfer the bypassed power to the resonator 116 through the path providing part 115. In this case, when the load impedance is increased due to the creation of the receiving environment that may supply power, the switching part 113 transfers the power oscillated according to a switching control signal of the switching controller 123 to the power amplifier 114, thereby transmitting power through the resonator 116 wirelessly. When the power transmission is completed, or the receiving side is removed, the magnetic coupling force is low and the impedance is low, accordingly increasing the voltage level of the second detection signal, such that the switching controller 123 controls the switching part 113 to again bypass the transfer path of the power.

Figure 3:
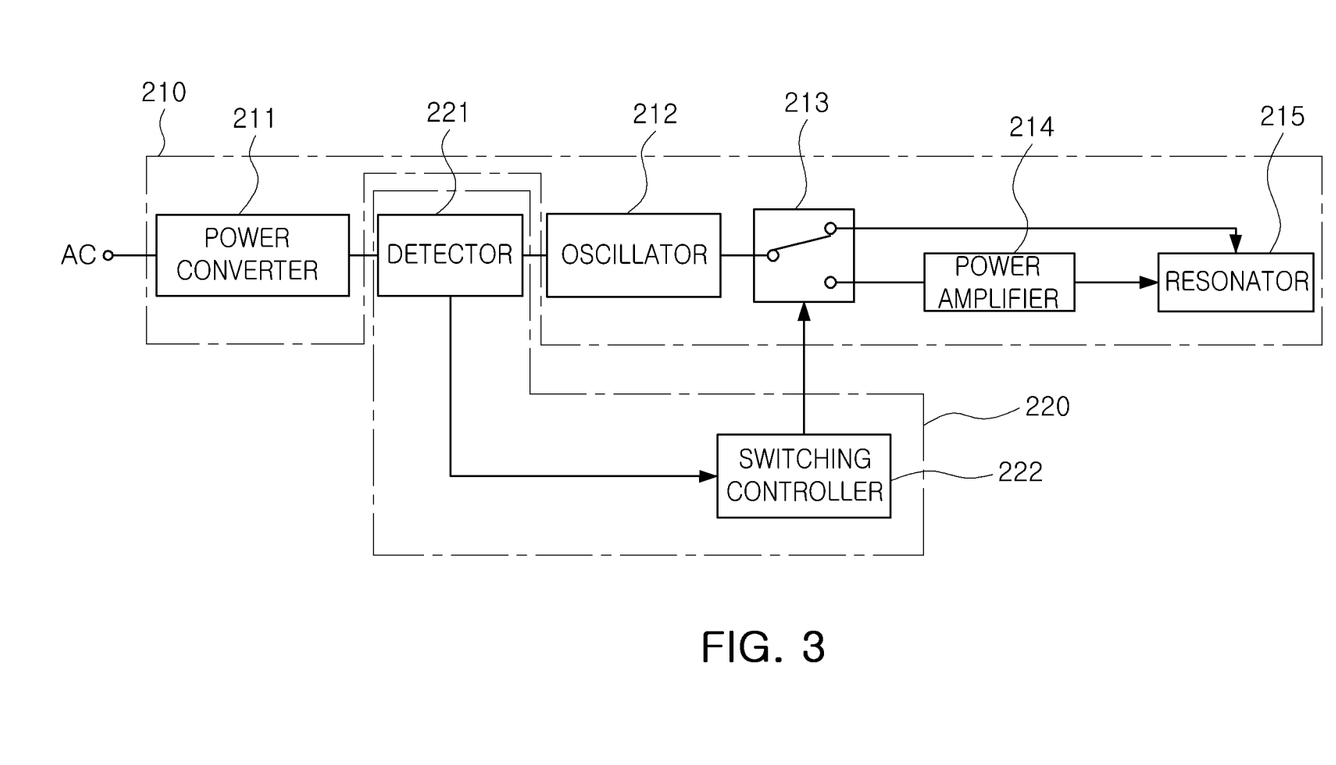
FIG. 3 is a schematic configuration diagram of a wireless power transmitter according to another exemplary embodiment of the present invention.

FIG. 3 is a schematic configuration diagram of a wireless power transmitter according to another exemplary embodiment of the present invention.

Referring to FIG. 3, in a wireless power transmitter 200 according to another exemplary embodiment of the present invention, a detector 221 of a controlling unit 220 may detect only the current level of the input power transferred to an oscillator 212 and a switching controller 222 may control the path switching of a switching part 213 based on a detection signal from the detector 221.

In addition, a power converter 211, the oscillator 212, the switching part 213, a power amplifier 214, and a resonator 215 of a wireless power transmitting unit 210 are the same as the description of FIG. 1 and therefore, a detailed description thereof will be omitted. However, since the embodiment shown in FIG. 2 does not include a second detector as a component, the path providing part 115 is not included as a component of the embodiment of FIG. 2.

Figure 4:
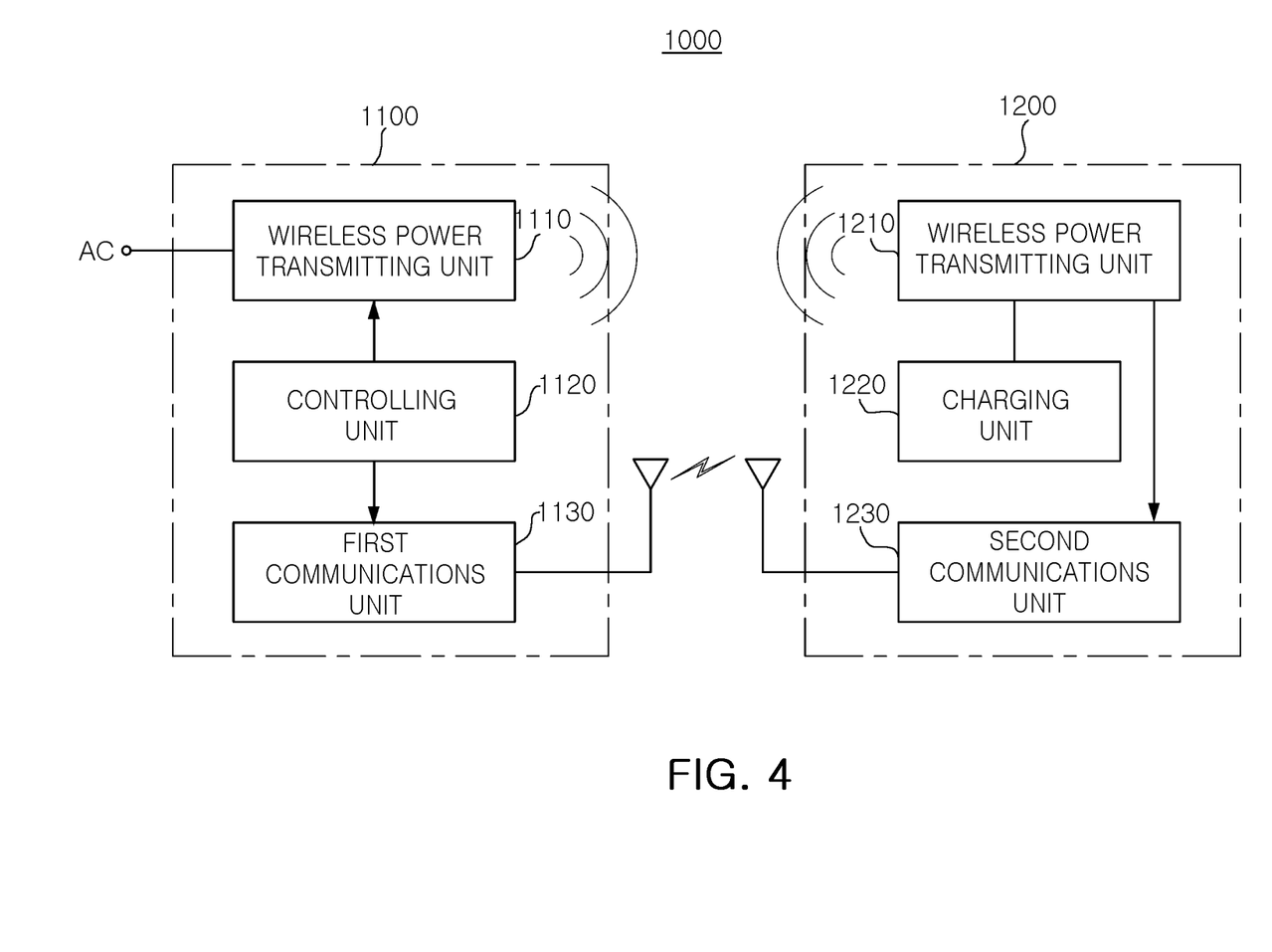
FIG. 4 is a schematic configuration diagram of a wireless power transceiver according to an exemplary embodiment of the present invention.

FIG. 4 is a schematic configuration diagram of a wireless power transceiver according to an exemplary embodiment of the present invention.

A wireless power transceiver 1000 according to an exemplary embodiment of the present invention may include a wireless power transmitter 1100 and a wireless power receiver 1200, as shown in FIG. 4.

The wireless power transmitter 1100 may include a wireless power transmitting unit 1110 and a controlling unit 1120, and may further include a first communications unit 1230 communicating with the wireless power receiver 1200. The first communications unit 1230 may communicate with the wireless power receiver 1200 by a previously established communications method.

The wireless power receiver 1200 may include a wireless power receiving unit 1210 receiving power from the wireless power transmitter 1100 wirelessly and converting the received power into driving power, a charging unit 1220 that is supplied with the driving power from the wireless power receiving unit 1210 to charge power, and a second communications unit 1230 that wakes up by being supplied with the driving power from the wireless power receiving unit 1210 to communicate with the first communications unit 1130.

For the saving of power in, and stability of, the wireless power transmitter 1100, the wireless power transmitting unit 1110 is required to appropriately generate power according to the state of the wireless power receiver 1200. In order to perform the above operation, the wireless power transmitting unit 1110 is required to check the information on the presence and absence of the wireless power receiver 1200 or the charge amount at any time.

First, in the idle mode of the wireless power transmitting unit, the first communications unit 1130 is in a receiving state at any time in the state in which the wireless power transmitting unit is turned-off. In this case, the second communications unit 1230 of the wireless power receiver 1200 transfers promised receiver state information at a predetermined short interval of time. When the wireless power receiving unit 1210 requires charging, the controlling unit 1120 of the transmitting unit side, recognizing the state of the wireless power receiving unit 1210 by communications, controls the wireless power transmitting unit 1100 to transfer power to the wireless power receiving unit 1210. When the first communications unit 1130 does not receive the signal, the wireless power receiver may not be within the charging environment or the charging unit may not have sufficient DC power to operate the second communications unit 1230, so the wireless power transmitting unit is required to periodically transmit the minimum power for operating the second communications unit 1230 at a short power pulse for a preset first time. In this case, when the wireless power receiver 1200 is in the charging environment, the response signal needs to be transmitted within a second time having a preset period.

When the first communications unit 1130 does not receive the response signal within the preset first time, the wireless power receiver 1200 is assumed to not be present and as a result, the wireless power transmitter 1100 minimizes power wastage by transmitting a short pulse for a third time having an interval longer than the first time.

Hereinafter, an operational principle of a wireless power receiver or a wireless power transceiver according to an exemplary embodiment of the present invention will be described in detail.

Figure 5A:
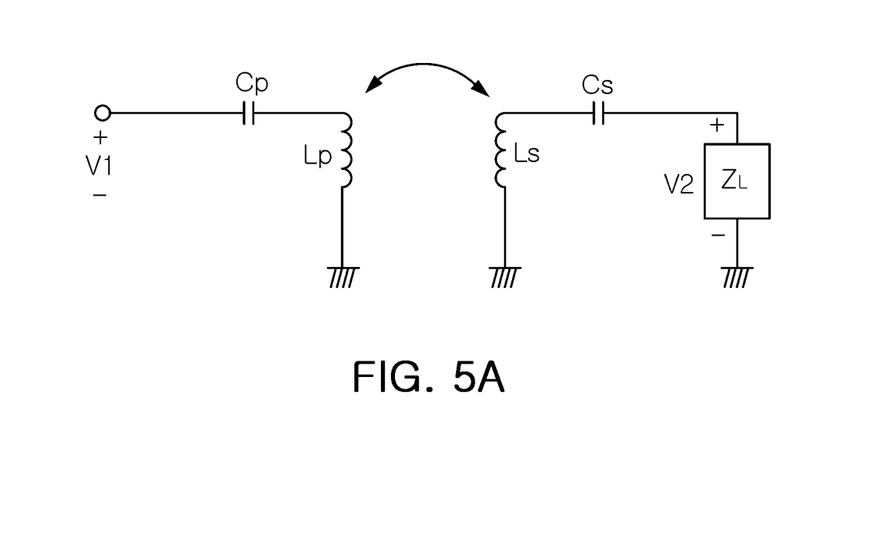
FIGS. 5A and 5B are equivalent circuit diagrams of transmitting and receiving units in the wireless power transceiver of the exemplary embodiment of the present invention.
Figure 5B:
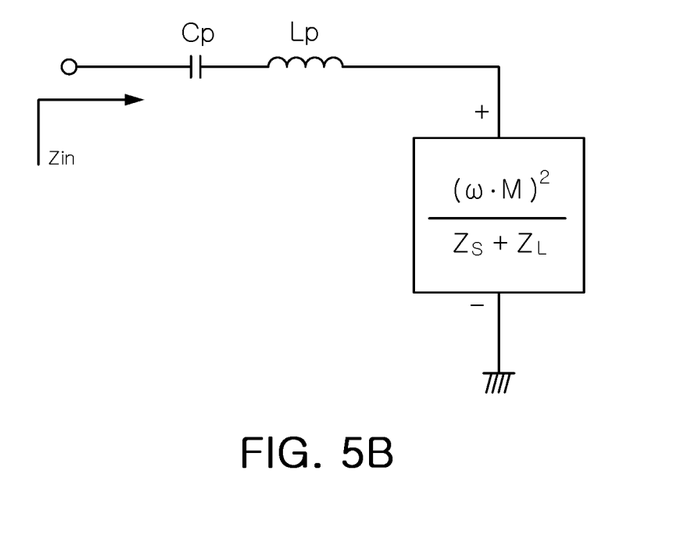

FIGS. 5A and 5B are equivalent circuit diagrams of transmitting and receiving units of the wireless power transceiver according to the exemplary embodiment of the present invention.

Referring to FIG. 5A, the respective transmitting and receiving units of the wireless power transceiver of the exemplary embodiment of the present invention may equivalently indicate inductors Lp and Ls and capacitors Cp and Cs and may be applied with power V1 and V2. Power may be transmitted between the wireless power transmitter and receiver by a magnetic resonance method. To this end, the loss of power is small within the space and the power may be transmitted wirelessly using a magnetic force that may reflect the entire amount of power to the transmitting side when energy is not applied to a medium. Energy transmission may be achieved by the magnetic coupling between the wireless power transmitter and receiver. In this case, the LC resonance frequency of the wireless power transmitter is equal to the LC resonance frequency of the wireless power receiver to generate the tune, thereby maximizing energy coupling.

Referring to FIG. 5B, the input impedance Zin, viewing the receiving side from the transmitting side, depends on the following Equation:

$$Z_{in} = Z_p + \frac{(\omega \cdot M)^2}{Z_s + Z_L}$$

$$Z_p = sL_p + \frac{1}{sC_p}, Z_s = sL_s + \frac{1}{sC_s}$$

$$M = k\sqrt{L_p \cdot L_s}$$

(Equation)

Where M indicates mutual inductance, k indicates the magnetic coupling coefficient equal to or smaller than 1, and Zs indicates impedance at the receiving side.

According to the above Equation, when the position of the wireless power receiver is changed or the magnetic coupling force is changed, the inductance and capacitance values are determined by the resonance frequency, such that the input impedance Zin is affected by the mutual inductance, and the mutual inductance is an equation of the magnetic coupling coefficient, such that the input impedance Zin is affected by the magnetic coupling coefficient.

Figure 6:
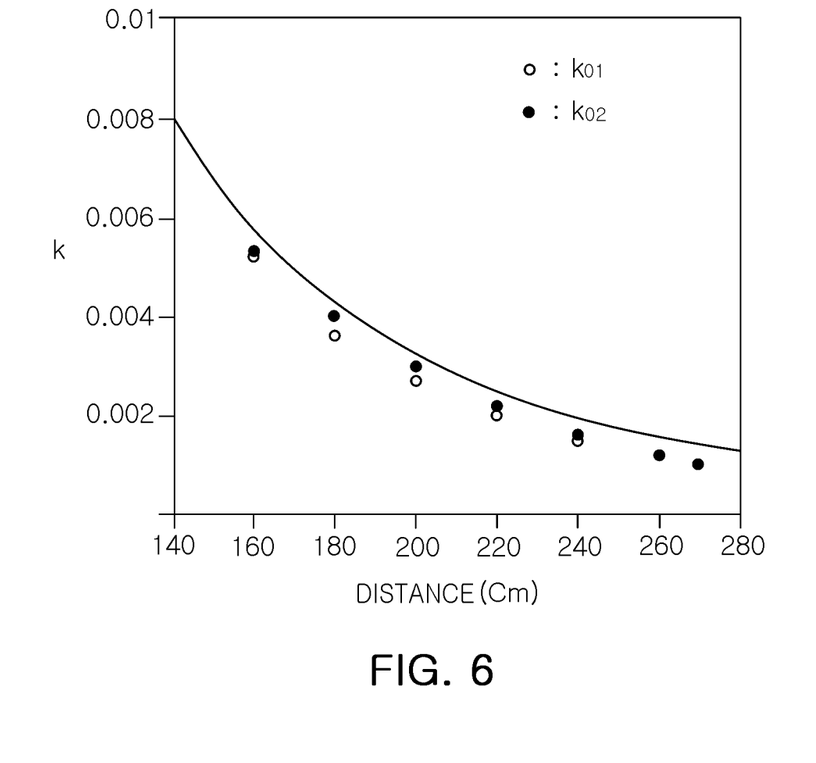
FIG. 6 is a graph measuring a change in a magnetic coupling coefficient according to a transmitting and receiving distance of the wireless power transmitter of the exemplary embodiment of the present invention.

FIG. 6 is a graph measuring a change in a magnetic coupling coefficient according to a transmitting and receiving distance of the wireless power transceiver of the exemplary embodiment of the present invention.

Referring to FIG. 6, as the transmitting and receiving distance of power is lengthened, the values of magnetic coupling coefficients KO1 and KO2 are reduced, and the impedance is lowered according to the above Equation.

Figure 7A:
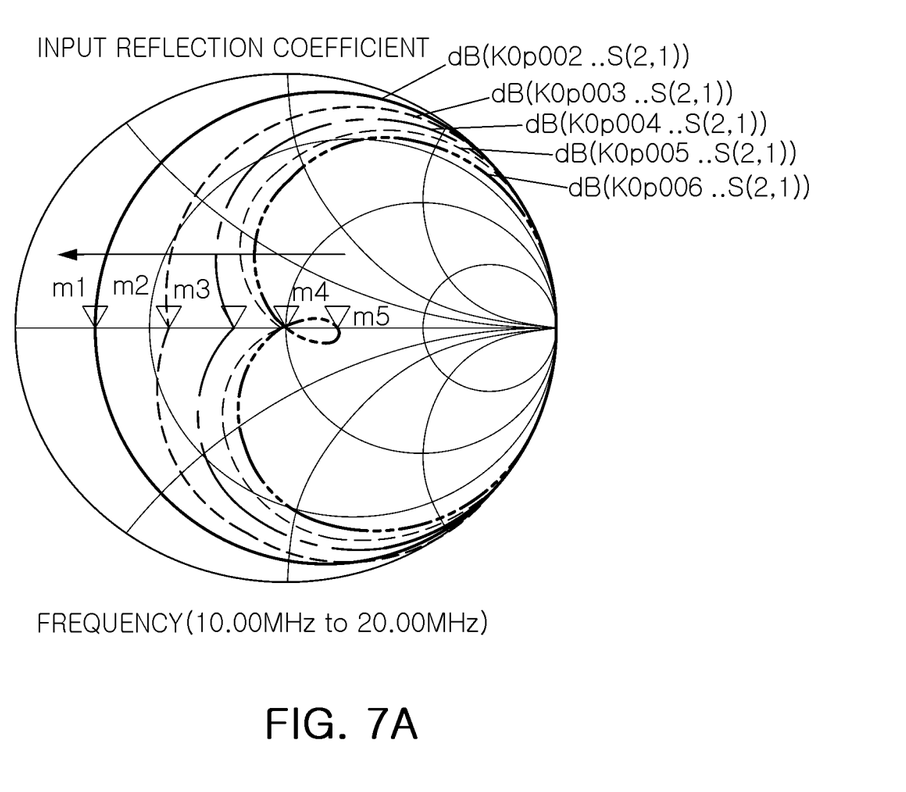
FIGS. 7A and 7B are Smith charts showing an insertion loss in transmitted energy due to a change in impedance according to a magnetic coupling coefficient between a transmitting side and a receiving side of the wireless power transceiver according to the exemplary embodiment of the present invention.
Figure 7B:
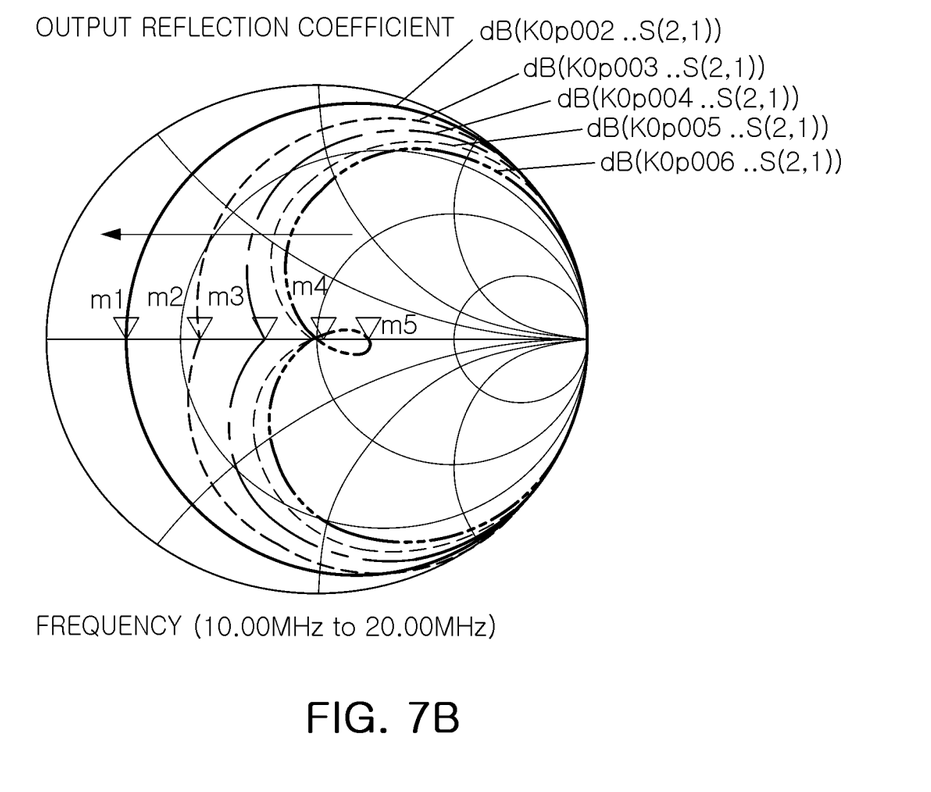
Figure 8:
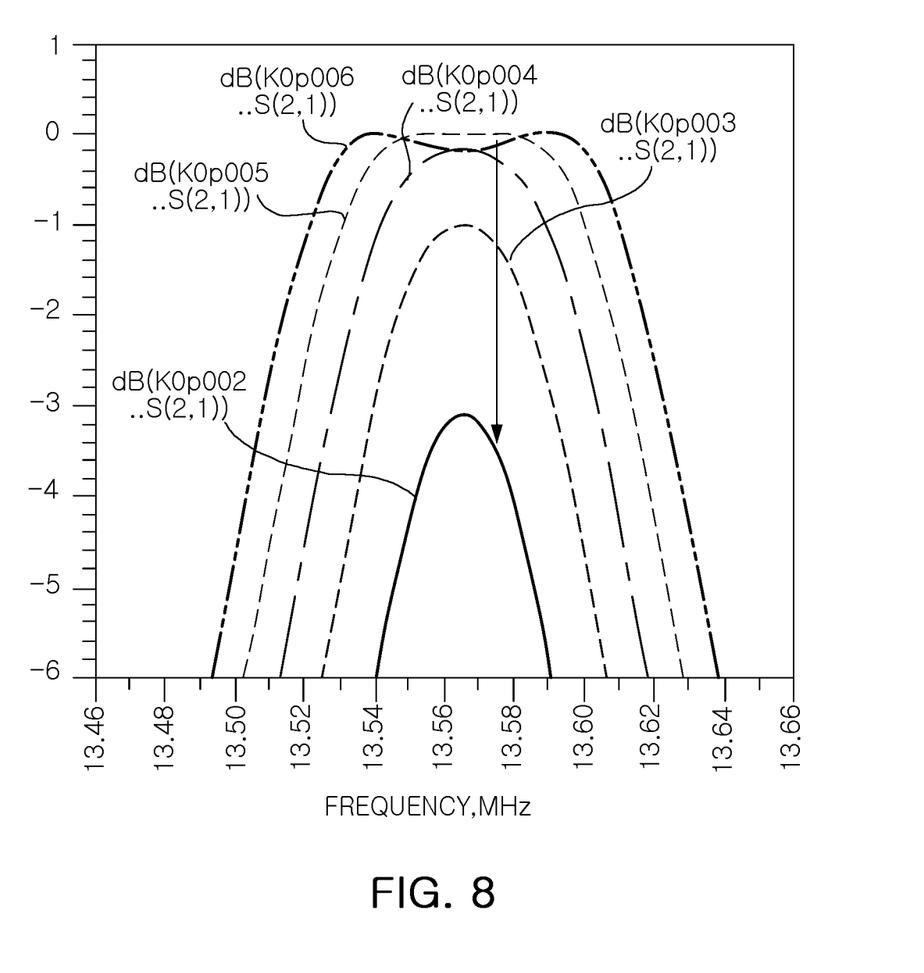
FIG. 8 is a dB graph of transmitted energy according to the magnetic coupling coefficient between the transmitting side and the receiving side of the wireless power transceiver of the exemplary embodiment of the present invention.

FIGS. 7A and 7B are Smith Charts showing the insertion loss of the transmitted energy due to the change in impedance according to the magnetic coupling coefficient between the transmitting side and the receiving side of the wireless power transceiver according to the exemplary embodiment of the present invention, and FIG. 8 is a dB graph of transmitted energy according to the magnetic coupling coefficient between the transmitting side and the receiving side of the wireless power transceiver of the exemplary embodiment of the present invention.

It can be appreciated from FIGS. 7A and 7B that even in the case that the magnetic coupling coefficient is variously set to 0.002, 0.003, 0.004, 0.005, and 0.006, the impedance varies according to distance, as shown by identification marks M1, M2, M3, M4, and M5 and therefore, the impedance is low when distance is large and the transmitted energy is accordingly low. Similarly, it can be appreciated from FIG. 8 that when the magnetic coupling coefficient is high, the dB of the transmitted energy is also high.

As set forth above, according to the exemplary embodiment of the present invention, power can be saved by transmitting the transmission power or waiting for the transmission of the transmission power according to the impedance of the output side, and there is no need to form a detection circuit, which detects the charging state or whether the reception of power is completed, at the receiving side, thereby reducing manufacturing costs and circuit area.

As set forth above, according to exemplary embodiments of the present invention, there is no need to form a detection circuit, which detects the charging state or whether the reception of power is completed, at the receiving side by transmitting the transmission power or waiting for the transmission of the transmission power according to the impedance of the output side, whereby a reduction in manufacturing costs and circuit area can be achieved.

While the present invention has been shown and described in connection with the exemplary embodiments, it will be apparent to those skilled in the art that modifications and variations can be made without departing from the spirit and scope of the invention as defined by the appended claims.

What is claimed is:

1. A wireless power transmitter, comprising:
  a wireless power transmitting unit converting an input power into a preset transmission power and transmitting the converted input power wirelessly,
  wherein the wireless power transmitting unit comprises:
    (a) an oscillator oscillating the input power at a preset resonance frequency;
    (b) a switching part coupled to the oscillator and providing two paths for the power oscillated by the oscillator depending upon switching thereof;
    (c) a power amplifier inserted in one of the two paths and amplifying the power supplied from the oscillator when the switching part switches to the path in which the power amplifier is inserted; and
    (d) a resonator resonating the power oscillated by the oscillator or the power amplified by the power amplifier at the resonance frequency and transmitting the power wirelessly by performing impedance matching; and
  a controlling unit comprising detectors detecting a level of output impedance of the transmission power outputted from the wireless power transmitting unit and controlling a transmission of the transmission power according to the level of output impedance of the transmission power output from the wireless power transmitting unit.

2. The wireless power transmitter of claim 1, wherein the wireless power transmitting unit further includes a path providing part providing the two paths, one of which is a path of the power transferred to the resonator and the other of which is a path of the power reflected by impedance mismatch.

3. The wireless power transmitter of claim 2, wherein the detectors include a first detector detecting a current level of the input power input to the oscillator; and a second detector detecting a power level of the reflected power, and the controlling unit includes a switching controller controlling the switching of the path performed by the switching part according to detection signals of the first detector and the second detector.

4. The wireless power transmitter of claim 3, wherein the first detector includes at least one detection resistor connected between a driving power end supplying a preset driving power and the oscillator in series.

5. The wireless power transmitter of claim 3, wherein the second detector includes: a pin diode receiving the reflected power; an inductor connected to the pin diode in series and outputting the detection signals; a capacitor connected between a connection point of the pin diode and the inductor and a ground in series; and a resistor connected between an output end of the inductor and the ground in series.

6. The wireless power transmitter of claim 3, wherein the switching controller is an exclusive NOR gate operating exclusive NOR on the detection signals from the first detector and the second detector.

7. The wireless power transmitter of claim 1, wherein the wireless power transmitting unit further includes a power converter converting commercial AC power into DC power and providing the converted DC power as the input power, and the output of the power converter is inputted into the oscillator.

8. The wireless power transmitter of claim 1, wherein the detectors include a detector detecting a current level of the input power input to the oscillator, and the controlling unit includes a switching controller controlling the switching of the path performed by the switching part according to a detection signal of the detector.

9. The wireless power transmitter of claim 8, wherein the detector includes at least one detection resistor connected between a driving power end supplying a preset driving power and the oscillator in series.

10. The wireless power transmitter of claim 1, wherein the wireless power transmitting unit transmits the transmission power by a magnetic resonance method.

11. The wireless power transmitter of claim 1, wherein the wireless power transmitting unit transmits the transmission power by a magnetic induction method.

12. The wireless power transmitter of claim 1, further comprising a communications unit communicating with a wireless power receiver receiving the transmission power by a previously established communications method.

13. A wireless power transceiver, comprising:
a wireless power transmitter having a wireless power transmitting unit converting input power into a preset transmission power and transmitting the converted input power wirelessly, wherein the wireless power transmitting unit comprises:
(a) an oscillator oscillating the input power at a preset resonance frequency;
(b) a switching part coupled to the oscillator and providing two paths for the power oscillated by the oscillator depending upon switching thereof;
(c) a power amplifier inserted in one of the two paths and amplifying the power supplied from the oscillator when the switching part switches to the path in which the power amplifier is inserted; and
(d) a resonator resonating the power oscillated by the oscillator or the power amplified by the power amplifier at the resonance frequency and transmitting the power wirelessly by performing impedance matching; and a controlling unit comprising detectors detecting a level of output impedance of the transmission power outputted from the wireless power transmitting unit and controlling a transmission of the transmission power according to the level of output impedance of the transmission power output from the wireless power transmitting unit; and
a wireless power receiver charged by being supplied with the transmission power from the wireless power transmitter.

14. The wireless power transceiver of claim 13, wherein the wireless power transmitting unit further includes a path providing part providing the two paths one of which is a path of the power transferred to the resonator and the other of which is a path of the power reflected by impedance mismatch.

15. The wireless power transceiver of claim 14, wherein the detectors include a first detector detecting a current level of the input power input to the oscillator; and a second detector detecting a power level of the reflected power, and the controlling unit includes a switching controller controlling the switching of the path performed by the switching part according to detection signals of the first detector and the second detector.

16. The wireless power transceiver of claim 15, wherein the first detector includes at least one detection resistor connected between a driving power end supplying a preset driving power and the oscillator in series.

17. The wireless power transceiver of claim 15, wherein the second detector includes: a pin diode receiving the reflected power; an inductor connected to the pin diode in series and outputting the detection signals; a capacitor connected between a connection point of the pin diode and the inductor and a ground in series; and a resistor connected between an output end of the inductor and the ground in series.

18. The wireless power transceiver of claim 15, wherein the switching controller is an exclusive NOR gate operating exclusive NOR on the detection signals from the first detector and the second detector.

19. The wireless power transceiver of claim 13, wherein the wireless power transmitting unit further includes a power converter converting commercial AC power into DC power and providing the converted DC power as the input power, and the output of the power converter is inputted into the oscillator.

20. The wireless power transceiver of claim 13, wherein the detectors include a detector detecting a current level of the input power input to the oscillator, and the controller includes a switching controller controlling the switching of the path performed by the switching part according to a detection signal of the detector.

21. The wireless power transceiver of claim 20, wherein the detector includes at least one detection resistor connected between a driving power end supplying a preset driving power and the oscillator in series.

22. The wireless power transceiver of claim 13, wherein the wireless power transmitting unit transmits the transmission power by a magnetic resonance method.

23. The wireless power transceiver of claim 13, wherein the wireless power transmitting unit transmits the transmission power by a magnetic induction method.

24. The wireless power transceiver of claim 13, wherein the wireless power receiver includes: a wireless power receiving unit supplied with the transmission power and converting the received transmission power into a preset driving power; and a charging unit allowing the driving power from the wireless power receiving unit to be charged.

25. The wireless power transceiver of claim 24, wherein the wireless power transmitter further includes a first communications unit communicating with the wireless power receiver by a previously established communications method.

26. The wireless power transceiver of claim 25, wherein the wireless power receiver further includes a second communications unit being woken up by the wireless power receiving unit and communicating with the first communications unit.

\* \* \* \* \*